United States Patent
Wusthoff et al.

(10) Patent No.: US 8,046,779 B2
(45) Date of Patent: Oct. 25, 2011

(54) DYNAMIC RESOLUTION OF DEPENDENT COMPONENTS

(75) Inventors: Mark Wusthoff, Carrickfergus (GB); Christoph Hartmann, Postdam (DE)

(73) Assignee: SAP AG, Walldorf (DE)

( * ) Notice: Subject to any disclaimer, the term of this patent is extended or adjusted under 35 U.S.C. 154(b) by 902 days.

(21) Appl. No.: 12/038,605

(22) Filed: Feb. 27, 2008

(65) Prior Publication Data
US 2009/0217306 A1 Aug. 27, 2009

(51) Int. Cl.
*G06F 13/00* (2006.01)
(52) U.S. Cl. .......... 719/328; 717/153; 717/162
(58) Field of Classification Search .......... 719/328; 717/153, 162
See application file for complete search history.

(56) References Cited

U.S. PATENT DOCUMENTS

| | | | |
|---|---|---|---|
| 6,484,276 B1 * | 11/2002 | Singh et al. | 714/41 |
| 6,704,750 B2 * | 3/2004 | Asazu | 707/999.003 |
| 6,782,531 B2 * | 8/2004 | Young | 717/130 |
| 7,509,638 B2 * | 3/2009 | Backhouse et al. | 717/177 |
| 2003/0058884 A1 * | 3/2003 | Kallner et al. | 370/465 |
| 2005/0223101 A1 | 10/2005 | Hayes, Jr. | |
| 2006/0112368 A1 * | 5/2006 | Gowen et al. | 717/100 |
| 2006/0248508 A1 * | 11/2006 | Jeghers | 717/114 |
| 2006/0288085 A1 | 12/2006 | Alam et al. | |
| 2008/0235710 A1 * | 9/2008 | Challenger et al. | 719/316 |

FOREIGN PATENT DOCUMENTS

EP 1 310 868 5/2003

* cited by examiner

*Primary Examiner* — Andy Ho
(74) *Attorney, Agent, or Firm* — Fish & Richardson P.C.

(57) ABSTRACT

The dynamic resolution of dependent components of a plug-in including, during a runtime of an application, dynamically accessing, for a plug-in invoked by the application, a manifest listing classes capable of providing an interface for the plug-in, and dependent components that provide functionality to the plug-in, and dynamically instantiating a class instance of at least one of the listed classes. Furthermore, the process includes dynamically resolving the listed dependent components, and dynamically loading the plug-in.

18 Claims, 5 Drawing Sheets

DYNAMIC RESOLUTION OF DEPENDENT COMPONENTS

FIELD

The present disclosure generally relates to plug-ins.

BACKGROUND

A plug-in is a computer program that interacts with a host application, such as a web browser, an email client or a server-side application component, to provide certain specific functionality. In various contexts, a plug-in may also be referred to as a plug-in component, a plugin, a pluggable component, a runtime component, or by other names. Typically, dependencies of a plug-in that represent references to external entities must be resolved during compile-time.

SUMMARY

According to one general implementation, plug-in dependencies are resolved during the runtime of a host application, and an interface between the host application and the plug-in is selected, based on using meta information stored in a manifest associated with the plug-in. In this manner, the plug-in may be dynamically loaded, unloaded, and/or re-loaded by the host application, without requiring the program code of the host application to reference dependent components of the plug-in.

According to another general implementation, a computer-implemented process includes, during a runtime of an application, dynamically accessing, for a plug-in invoked by the application, a manifest listing classes capable of providing an interface for the plug-in, and dependent components that provide functionality to the plug-in, and dynamically instantiating a class instance of at least one of the listed classes. Furthermore, the process includes dynamically resolving the listed dependent components, and dynamically loading the plug-in.

Implementations may include one or more of the following features. For example, the process may include dynamically re-loading or unloading the plug-in during the runtime of the application, such as by un-resolving the listed dependent components and de-instantiating the class instance. The interface may be an Application Programmable Interface (API). Instantiating the class instance may further include instantiating first and second class instances of the at least one of the listed classes, where the first and second class instances are isolated at a component instance level. The first and second class instances may be instantiated using first and second class instance factories, respectively, where the isolated first and second class instances are non-identical despite the at least one of the listed classes being the same.

In further examples, the process may further include communicating, via the interface provided by the instantiated class instance, a request from the application to the plug-in to perform functionality provided by the dependent components, the request identifying the plug-in using a unique identifier or resource locator. The process may also include, during the runtime of the application, dynamically selecting the at least one of the listed classes based on a version of the interface, the application, or the dependent components, where the selected at least one of the listed classes is instantiated as the class instance.

In further examples, the manifest may further include an identifier or name of the plug-in, a version of the plug-in, a provider of the plug-in, information regarding a license of the plug-in, a digital signature of the plug-in, and redirection information pointing to a location of the plug-in. The classes capable of providing the interface between the application and the plug-in are listed as class descriptors, where each class descriptor further includes an identifier or name of the class, a plain text description of a functionality of the class, information regarding a license of the class, a digital signature of the class, and redirection information point to a location of the class. Resolving the listed dependent components may further include pre-loading or caching the listed dependent components, where the plug-in may be loaded based on instantiating the class instance and further based on resolving the listed dependent components. At a compile-time of the plug-in, the program code of the host application may not reference dependent components of the plug-in.

According to another general implementation, a device includes a processor configured to, during a runtime of an application, dynamically access, for a plug-in invoked by the application, a manifest listing classes capable of providing an interface for the plug-in, and dependent components that provide functionality to the plug-in, and to instantiate a class instance of at least one of the listed classes. The processor is further configured to resolve the listed dependent components, and to load the plug-in.

According to a further general implementation, a computer program product is tangibly embodied in a machine-readable medium. The computer program product includes instructions that, when read by a machine, operate to cause data processing apparatus to, during a runtime of an application, dynamically access, for a plug-in invoked by the application, a manifest listing classes capable of providing an interface for the plug-in, and dependent components that provide functionality to the plug-in, and to dynamically instantiate a class instance of at least one of the listed classes. The computer program product also includes instructions that operate to cause the data processing apparatus to, during a runtime of an application, dynamically resolve the listed dependent components, and to dynamically load the plug-in.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 1 is a block diagram of an exemplary system that implements the dynamic resolution of dependent components of a plug-in.

FIG. 2 is a flowchart illustrating an exemplary process for dynamically resolving dependent components of a plug-in.

Like reference numbers represent corresponding parts throughout.

DETAILED DESCRIPTION

The enhanced approach technique described herein effects the resolution of plug-in dependencies and the selection of an interface between the host application and the plug-in during the runtime of a host application, using meta information stored in a manifest associated with the plug-in. In this manner, the plug-in may be dynamically loaded, unloaded, and/or re-loaded by the host application, without requiring the program code of the host application to reference dependent components of the plug-in.

Such an approach allows plug-ins to become more complex and adaptable, and to incorporate an increasing number of third party components which can be managed at runtime. In doing so, a tool kit is provided for selecting, resolving dependencies of, and loading plug-ins at runtime, to thereby add desired functionality to a host application, providing a significant enhancement over other technologies which merely address dependency resolution during compile-time of the plug-in.

As used herein, a 'dependency' relates to any reference to an external entity or dependent component, such as via a Universal Resource Locator (URL). A dependency may also relate to the external entity or dependent component itself. As such, resolution of dependencies may occur or may be required to occur prior to achieving full functionality of a particular plug-in. The enhanced approach described herein may provide for explicit and complete resolution of any dependencies.

Further, 'compile-time' (as contrasted with 'runtime') refers to operations performed by a compiler, or requirements that must be met by source code for an operation to be successful. Compile-time generally occurs prior to link time and runtime. In a similar vein, runtime refers to the time after compile-time when an application is loaded, executed or otherwise invoked. Moreover, 'dynamic' operations pertain to operations that occur with or during computer program execution, as contrasted with 'static' operations that occur without computer program execution.

Figure 1:
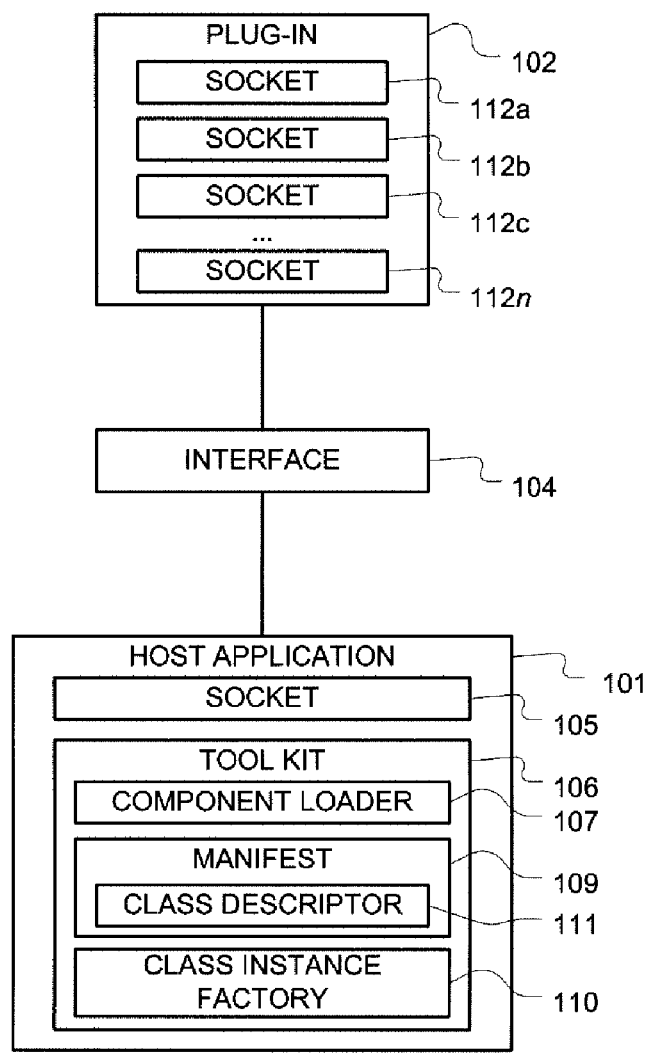

FIG. 1 is a block diagram of an exemplary system 100 that implements the dynamic resolution of dependent components of a plug-in. The system 100 includes a host application 101 and a plug-in 102 that communicate via an interface 104. The host application 101 includes a socket 105 into which plug-in 102 "plugs-in," or provides particular functionality, and a tool kit 106.

The host application 101 may further implement middleware, such as the SUN MICROSYSTEMS® JAVA® or MICROSOFT .NET® virtual environments. The plug-in 102 represents any runtime component that may be plugged into or dynamically integrated with an application framework. Runtime components are generally compiled in a format to be used in a runtime environment, such as machine code to be executed on a certain hardware platform or intermediate code (such as MICROSYSTEMS® JAVA® bytecode or MICROSOFT® Common Intermediate Language (CIL)) to be executed in a virtual environment. Alternatively, runtime components may represent scripts that run using interpreters.

The plug-in 102 may be accessed by the host application 101 via predefined interfaces or APIs located in a program library that can be referenced by a unique identifier or resource locator. The tool kit 106 includes a component loader 107 that loads a given set of plug-ins, and that creates a single component instance of each dependent component of the plug-in, as referenced by a unique identifier or resource locator.

The component loader 107, which may be instantiated as a singleton, supports a load component (LOADCOMPONENT(URI)) functionality, an unload component (UNLOADCOMPONENT(URI)) functionality, and a find components (FINDCOMPONENTS(interface)) functionality. When executed, LOADCOMPONENT(URI) (where URI refers to a manifest of a component to be loaded) creates and stores a single COMPONENTMANIFEST instance of the plug-in 102 in the component loader 107 under the corresponding URI. With the invocation or execution of LOADCOMPONENT(URI), a pre-loading/caching process for dependent components of the plug-in 102 may be triggered.

When executed, UNLOADCOMPONENT(URI)) unloads the plug-in 102, in which case some or all references to the plug-in 102 and its respective instantiated classes are removed. After unloading, the plug-in 102 may again be re-loaded or updated using cache invalidation. When executed, FINDCOMPONENTS(interface)) selects plug-ins that, for the given interface 104 used by the host application 101, may communicate with the given interface 104, by returning a list of appropriate manifests (or COMPONENTMANIFEST instances).

The tool kit 106 further includes a manifest 109 (the "component manifest" or the COMPONENTMANIFEST class), and at least one class instance factory 110 that each create a single class instance. The COMPONENTMANIFEST class represents a plug-in, as described by a manifest. With each COMPONENTMANIFEST instance the manifest document is accessed, a single instance of a CLASSINSTANCEFACTORY is created, and list of CLASSMANIFEST instances is created and stored.

In addition to providing access to the manifest, the COMPONENTMANIFEST class provides a get classes (GETCLASSES( )) functionality, a find classes (FINDCLASSES(interface)) functionality, and a check signature (CHECKSIGNATURE(public key token)) functionality. When executed, GETCLASSES( ) returns a complete list of CLASSMANIFEST instances; FINDCLASSES(interface) performs a selection among the complete list of CLASSMANIFEST instances based on an IMPLEMENTSINTERFACE function and returns a list with the selected instances; and CHECKSIGNATURE(public key token) checks the digital signature of an associated component.

By default, instance creation is delegated to a class instance factory (or CLASSINSTANCEFACTORY class) associated with the component, where each instance of a class includes a reference back to the class. Each class includes a fully qualified name associated with its respective class instance factory, such that two class instances created from different instance factories are easily distinguishable.

The CLASSINSTANCEFACTORY class is an inner or nested class of the COMPONENTMANIFEST class, and provides an abstraction layer above the underlying middleware instance factories. Dependencies that have been extracted by the COMPONENTMANIFEST class are pre-loaded into a cache for fast access. The complete resolution of all classes may be based on the complete pre-loading of all dependencies, disregarding resolution strategies provided by the underlying middleware.

Class instances created by a particular instance of the CLASSINSTANCEFACTORY class are isolated at the component instant level from class instances created by other CLASSINSTANCEFACTORY class instances, such as by isolation from other components. The CLASSINSTANCEFACTORY class provides get class (GETCLASS(class name)) functionality which, when executed, returns an indicated, named or referenced class.

The manifest 109 itself includes at least one class descriptor 111 (or "class manifest," or CLASSMANIFEST class) that provides meta information on a particular class, where a look-up of an appropriate class descriptor is provided for the given interface 104 or API. The manifest 109 may be an XML document collocated with the plug-in 102, listing those classes that implement particular interfaces, and that also identifies, references, or otherwise lists dependent components of the plug-in 102. The manifest 109 may be accessible via a universal resource identifier (URI).

The CLASSMANIFEST class may be an inner or nested class of the COMPONENTMANIFEST class, and may represent the data given in the manifest. On construction of an instance of this class, a middleware dependent class or type representation associated with the name given in the manifest is created and stored by calling GETCLASS functionality associated with a given CLASSINSTANCEFACTORY class.

The CLASSMANIFEST class provides an implements interface (IMPLEMENTSINTERFACE(interface)) functionality, a create instance (CREATEINSTANCE( )) functionality, and a check signature (CHECKSIGNATURE(public key token)) functionality. When executed or otherwise invoked, IMPLEMENTSINTERFACE(interface) returns true or false depending on whether the class implements the interface 104; CREATEINSTANCE( ) creates an instance of the associated class; and CHECKSIGNATURE(public key token): checks the signature of the class. Put another way, the implements interface functionality allows for a matchmaking to occur between classes stored within the class manifest and interfaces supported by the host application 101.

The plug-in 102 includes at least one socket 112 (illustrated as sockets 112a to 112n, where n represents any integer), into which, when dependencies are resolved, dependent components such as library 114, component 115, plug-in 116, files, or any other collections of data are similarly plugged-in. During runtime, the plug-in 102 and its dependent components are accessible without locking.

The host application 101 may support the plug-in 102 for many reasons, including enabling third party developers to create capabilities to extend an application, reducing the size of an application, and separating source code from the application because of incompatible software licenses. If the source code of the dependent component is available, the tool kit 106 may create a compiled version of the dependent component during the resolution of dependencies.

The plug-in 116 may itself include a socket 117 referencing an external component that is resolved during or prior to the runtime of the plug-in 102. Put another way, the plug-in 102 may host plug-in 116, and the plug-in 116 may host a further plug-in. The resolution of the dependency created by the socket 117 may be dynamically resolved in a similar manner to the resolution of the dependencies created by the at least one socket 112.

By virtue of their advantages, plug-ins such as plug-in 102 are adaptable, and may be easily applied in many software architectures. Unlike plug-ins which use a static dependency resolution approach, in which all dependent components are bundled at compile-time and then shipped as a whole to the target runtime environment, the enhanced approach described herein provides for the dynamic resolution of dependencies at runtime. Such an approach is particularly useful for modern Service Oriented Architectures (SOAs), in which the target runtime environment of a host application, in particular large scale business applications, may no longer include a single entity or service, but rather may be distributed over several entities or services.

As such, the dynamic resolution of plug-in dependencies follows the paradigm of modularization and reusability that affects the runtime environment by modularizing and reusing program libraries used by the plug-in as well. Enhanced modularization as well as the increased variety of third party tools used in modern projects can be provided despite an increased number of external dependencies in relation to a particular development project. In this regard, the dependent component of a plug-in may be a third-party dependent component, as well as a dependent component developed by distributed teams from within the same organization.

Figure 2:
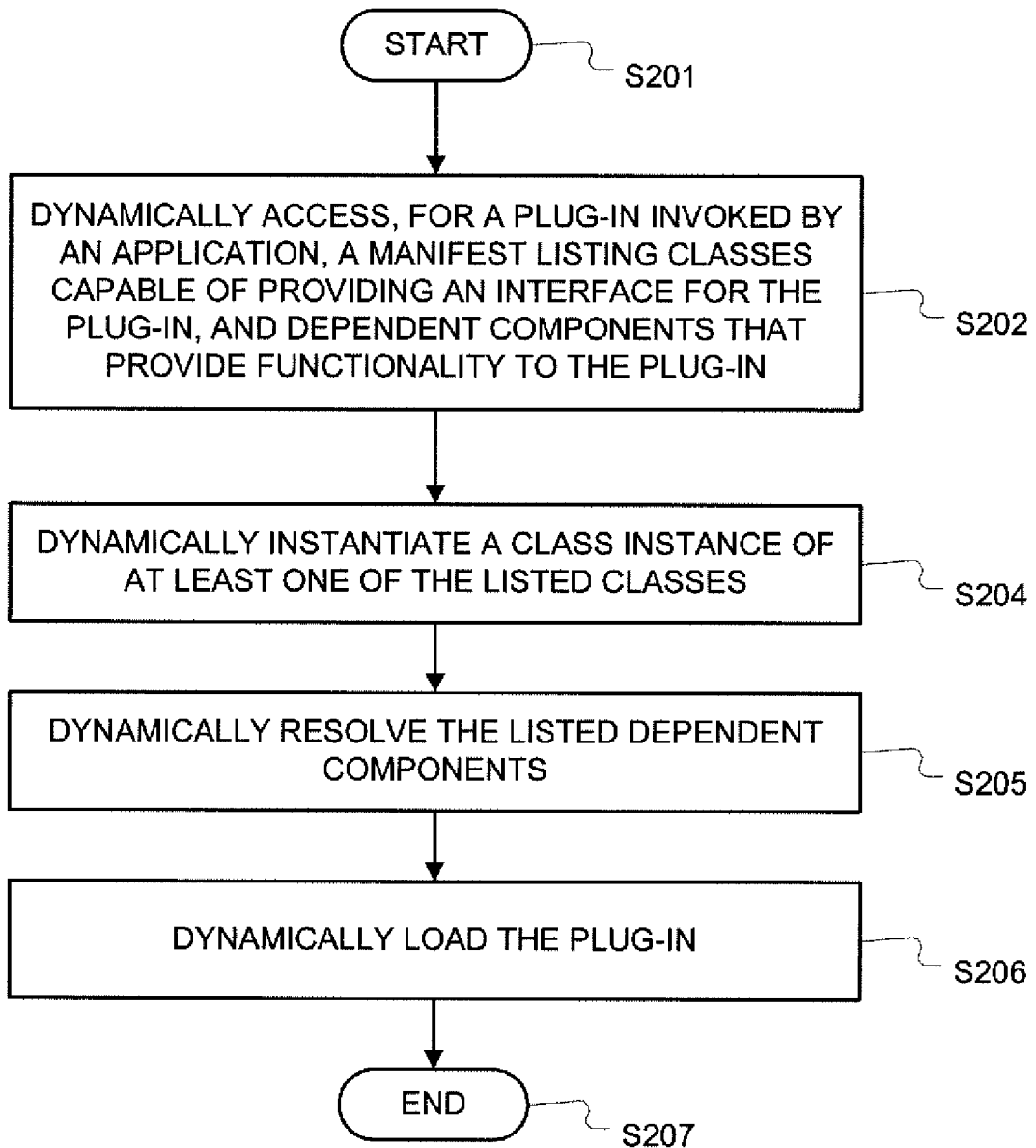

FIG. 2 is a flowchart illustrating an exemplary process 200 for dynamically resolving dependent components of a plug-in. Briefly, the process 200 includes, during a runtime of an application, dynamically accessing, for a plug-in invoked by the application, a manifest listing classes capable of providing an interface for the plug-in, and dependent components that provide functionality to the plug-in, and dynamically instantiating a class instance of at least one of the listed classes. Furthermore, the process includes dynamically resolving the listed dependent components, and dynamically loading the plug-in. In each case where a dynamic operation is described, a static operation may be substituted where appropriate.

In more detail, process 200 begins when a runtime of an application occurs (S201). For a plug-in invoked by the application, a manifest listing classes capable of providing an interface for the plug-in, and dependent components that provide functionality to the plug-in is dynamically accessed (S202). The interface may be an API that supports requests for services made between the plug-in and the host application, or any other type of interface, where each class describes rules by which an interface behaves.

A class instance is created or "instantiated" from a given class, and providing functionality to the enacting runtime, describing how interaction between the plug-in and host application may occur. The identity of the dependent components of the plug-in may not be identified in the code of the host application.

During the runtime of the application, the at least one of the listed classes may be dynamically selected based on a version of the interface, the application, or the dependent components, where the selected at least one of the listed classes is instantiated as the class instance. In such a case, the plug-in may be devised to support polymorphism, versioning and life cycle management. For instance, the same API can have variations in its implementation depending on certain state parameter, requiring dynamic updates.

The manifest may further include an identifier or name of the plug-in, a version of the plug-in, a provider of the plug-in, information regarding a license of the plug-in, a digital signature of the plug-in, and redirection information pointing to a location of the plug-in. Table 1, for instance, identifies certain data stored within a manifest COMPONENTMANIFESTTYPE, and provides descriptions of the identified data.

TABLE 1

| Exemplary Manifest Contents COMPONENTMANIFESTTYPE | |
|---|---|
| ID | The identifier or name of the plug-in. |
| VERSION | The version of the plug-in. The combination of ID and VERSION provides a fully qualified name. |
| CLASSMANIFEST | One or more elements of type CLASSMANIFESTTYPE. |
| DEPENDENCY | Zero or more references pointing to an external entity or other dependent component. The reference may be universal (via a URL or URI) or relative to the location of the manifest. |
| DESCRIPTION | Plain text description of the plug-in. |
| PROVIDER | The provider of the plug-in |
| LICENSEINFO | Information regarding the license of the plug-in, including terms and conditions of use. |
| SIGNATURE | The digital signature of the plug-in, for example the signature of the archive file that can be verified on download. |
| LOCATION | A redirection that points to the location of the plug-in. In case the manifest is directly bundled with the plug-in, this element may be omitted. If the nature of the redirection is a relative reference, it is relative to the location of the manifest. |

The classes capable of providing the interface between the application and the plug-in are listed as class descriptors, where each class descriptor further includes an identifier or name of the class, a plain text description of a functionality of the class, information regarding a license of the class, a digital signature of the class, and redirection information point to a location of the class. Table 2, for instance, identifies certain data stored within a class descriptor CLASSMANIFESTTYPE, and provides descriptions of the identified data.

TABLE 2

Examplary Class Descriptor Contents
CLASSMANIFESTTYPE

| | |
|---|---|
| NAME | The name of the class that provides for communication via the interface for a given plug-in. |
| DESCRIPTION | Plain text description of the functionality of the class. |
| LICENSEINFO | Information regarding the license of the class. |
| SIGNATURE | An digital signature of the class code. |
| LOCATION | An redirection that points to the location of the class (universal or relative to the manifest). |

Using the above-noted exemplary contents of a manifest and class descriptor, a manifest schema may be assembled and implemented. For instance, Table 3 provides an exemplary data schema for an exemplary manifest, coded using XML, that utilizes the contents described in Tables 1 and 2:

TABLE 3

Exemplary data schema

```
<?xml version="1.0" encoding="UTF-8"?>
<schema targetNamespace="http://crbfs.sap.com/pluggable-component"
elementFormDefault="qualified"
xmlns="http://www.w3.org/2001/XMLSchema"
xmlns:tns="http://crbfs.sap.com/pluggable-component">
    <complexType name="classManifestType">
        <sequence>
            <element name="name" type="string"></element>
            <element name="description" type="string"></element>
            <element name="licenseInfo" type="string"></element>
            <element name="signature"
            type="base64Binary"></element>
            <element name="location" type="anyURI"></element>
        </sequence>
    </complexType>
    <complexType name="componentManifestType">
        <sequence>
            <element name="id" type="anyURI"></element>
            <element name="version" type="string"></element>
            <element name="classManifest"
            type="tns:classManifestType"
                    maxOccurs="unbounded" minOccurs="1">
            </element>
            <element name="dependency" type="anyURI"
                    maxOccurs="unbounded" minOccurs="0">
            </element>
            <element name="description" type="string"></element>
            <element name="provider" type="string"></element>
            <element name="licenseInfo" type="string"></element>
            <element name="signature"
            type="base64Binary"></element>
            <element name="location" type="anyURI"></element>
        </sequence>
    </complexType>
    <element name="componentManifest"
type="tns:componentManifestType"></element>
</schema>
```

In essence, the schema shown in Table 3 includes two complex types, COMPONENTMANIFESTTYPE (describing the manifest) and CLASSMANIFESTTYPE (describing the class descriptor), with COMPONENTMANIFEST being the root element.

A class instance of at least one of the listed classes is dynamically instantiated (S204). Instantiating the class instance may further include instantiating first and second class instances of the at least one of the listed classes, where the first and second class instances are isolated at a component instance level. For instance, the plug-in may include multiple versions or implementations of a particular dependent component for an interface, where multiple versions may be instantiated and isolated at a given time.

Two or more instances of the same component may be isolated at the component instance level, such that any class instance created in the realm of a component instance is non-identical to any other class instance outside of the component instance, despite the fact that the underlying class might be the same in both cases. Isolation at the component instance level may contrast with isolation on an application level or a memory level, such as provided by process boundaries or application domains.

The first and second class instances may be instantiated using first and second class instance factories, respectively, where the isolated first and second class instances are non-identical despite the at least one of the listed classes being the same. Some or all dependencies associated with the dependent components may be isolated so as to freely coexist in a common runtime.

The listed dependent components are dynamically resolved (S205). Resolving the listed dependent components may further include pre-loading or caching the listed dependent components, where the plug-in may be loaded based on instantiating the class instance and further based on resolving the listed dependent components.

The plug-in is dynamically loaded (S206), thereby ending the process 200 (S207). Using this process, plug-ins can be deployed, redeployed or decommissioned during runtime, where dependent components can be stored at any location within an intranet or on the Internet.

In allowing the plug-in to be dynamically loaded during the runtime of a host application, the enhanced approach described herein is distinguishable from other approaches which require an explicit list of all dependencies to resolve the references within the target component, at compile time. For instance, the enhanced approach provides that the plug-in includes all required archives and binary files the component dependencies were referring to at run-time, instead of at compile time.

As such, support is provided to load the dependencies at runtime on demand, as well as to provide more complete life cycle management. Specifically, the plug-in is capable of being deployed, started, stopped, and decommissioned without affecting other parts, aspects, or functionalities of the host application.

The process 200 may further include communicating, via the interface provided by the instantiated class instance, a request from the application to the plug-in to perform functionality provided by the dependent components, the request identifying the plug-in using a unique identifier or resource locator.

The process 200 may include dynamically re-loading or unloading the plug-in during the runtime of the application, such as by un-resolving the listed dependent components and de-instantiating the class instance. As such, the enhanced approved described herein provides robust lifecycle management for plug-ins and their dependent components, without necessarily interfering with the core functionality of the plug-in, and without adding computationally expensive configuration overhead. During the unloading process, all references to previously resolved classes within a plug-in are removed.

Figure 3:
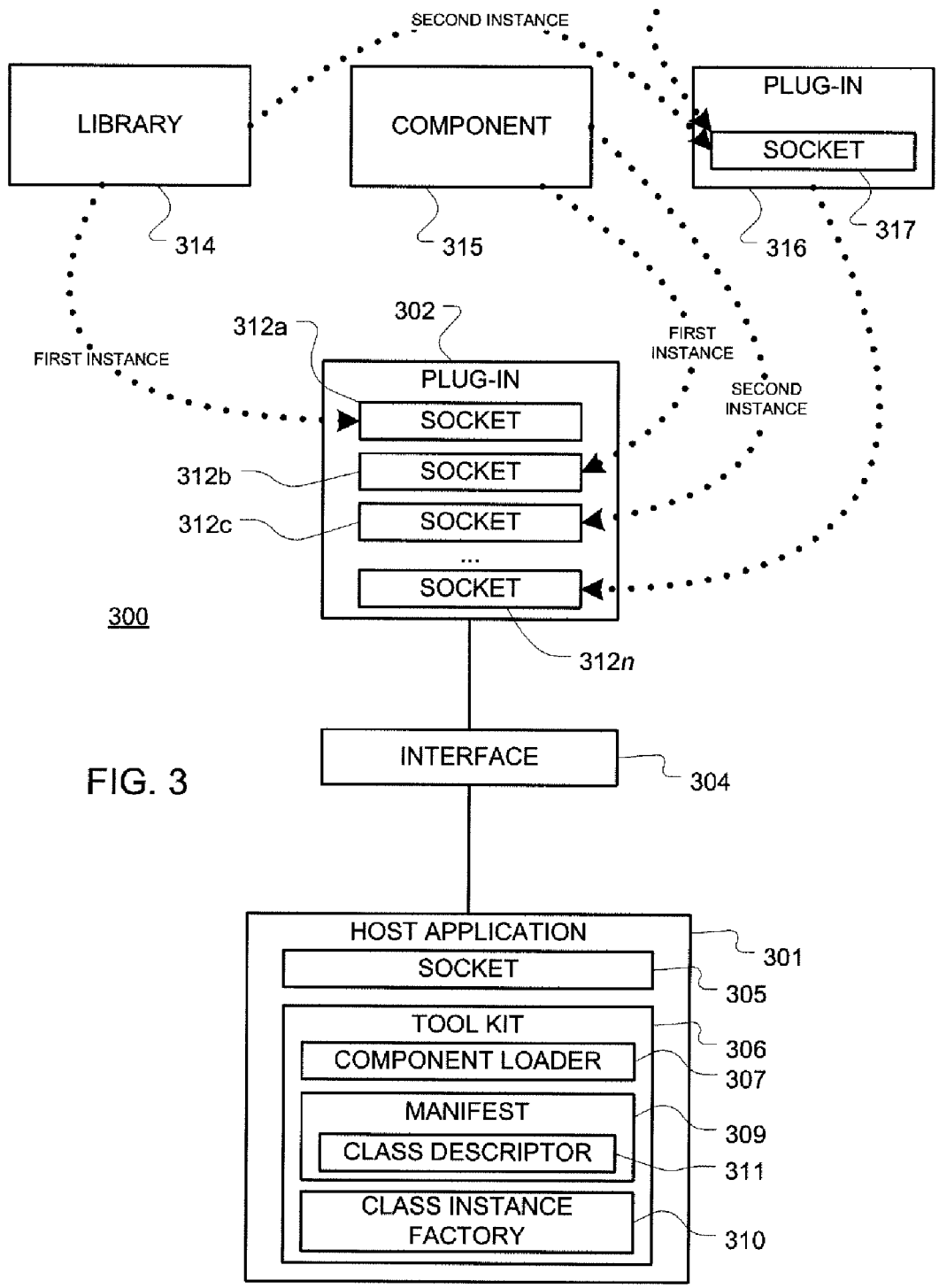
FIG. 3 is a contextual diagram illustrating the dynamic resolution of dependent components of a plug-in, in operation.

FIG. 3 is a contextual diagram illustrating the dynamic resolution of dependent components of a plug-in, in operation. In FIG. 3, the system 300 includes a host application 301 and a plug-in 302 that communicate via an interface 304. The host application 301 includes a socket 305 into which plug-in 302 "plugs-in," or provides particular functionality, and a tool kit 306.

The plug-in 302 may be accessed by the host application 301 via predefined interfaces or APIs located in a program library that can be referenced by a unique identifier or resource locator. The tool kit 306 includes a component loader 307 that loads a given set of plug-ins, and that creates a single component instance of each component of the plug-in, as referenced by a unique identifier or resource locator.

The tool kit 306 further includes a manifest 309 and at least one class instance factory 310, each for creating a single class instance. The manifest 309 itself includes at least one class descriptor 311 that provides meta information on a particular class, where a look-up of an appropriate class descriptor is provided for a given interface or API. The manifest 309 may be an XML document collocated with the plug-in, listing those classes that implement particular interfaces, and that also identifies, references, or otherwise lists dependent components of the plug-in.

The plug-in 302 includes at least one socket 312 (illustrated as sockets 312a to 312n, where n represents any integer), into which, when dependencies are resolved, dependent components such as library 314, component 315, plug-in 316, files, or any other collections of data are similarly plugged-in. During runtime, the plug-in 302 and its dependent components are accessible without locking.

The plug-in 316 may itself include a socket 317 referencing an external component that is resolved during or prior to the runtime of the plug-in 302. Put another way, the plug-in 302 may host plug-in 316, and the plug-in 316 may host another plug-in. The resolution of the dependency created by the socket 317 may be dynamically resolved in a similar manner to the resolution of the dependencies created by the at least one socket 312.

During the run-time of the host application 301, and using the technique described herein, dependencies of the plug-in 302 are dynamically resolved. In particular, the dependency associated with the socket 312a, which refers to the library 314, is resolved by instantiating a first instance of the library 314. Furthermore, dependencies associated with the sockets 312b and 312c, which both refer to the component 315, are resolved by instantiating first and second instances of the component 315, which are isolated at the component instance level.

The dependency associated with the socket 312n, which refers to the plug-in 316, is resolved by instantiating an instance of the plug-in 316. Since the plug-in 316 includes its own dependency associated with the socket 317, however, that dependency is resolved (for example by instantiating a second, different instance of the library 315 or of some other file) prior to, during, or after the resolution of the dependency associated with the socket 312. In each case where an instance of a dependent component is created, the instance may be pre-loaded or cached to satisfy or plug-in that instance to its associated socket.

Using the tool kit 306, the application developer is shielded from the intricacies of tracking all dependencies for the plug-in to be used. The development of application code may thus depends on the plug-in interface, leading perhaps to a significant reduction of dependencies. The application deployment is simplified as well, since the plug-in and all its dependencies may be loaded at runtime instead of compile time.

Thus, the enhanced approach allows for handling requests to load additional code and for resolving dependencies during runtime. Further, the host application can be programmed to control the selection of various implementations for a single interface during runtime, and for the caching, loading, unloading and updating of plug-ins and dependent components.

Figure 4:
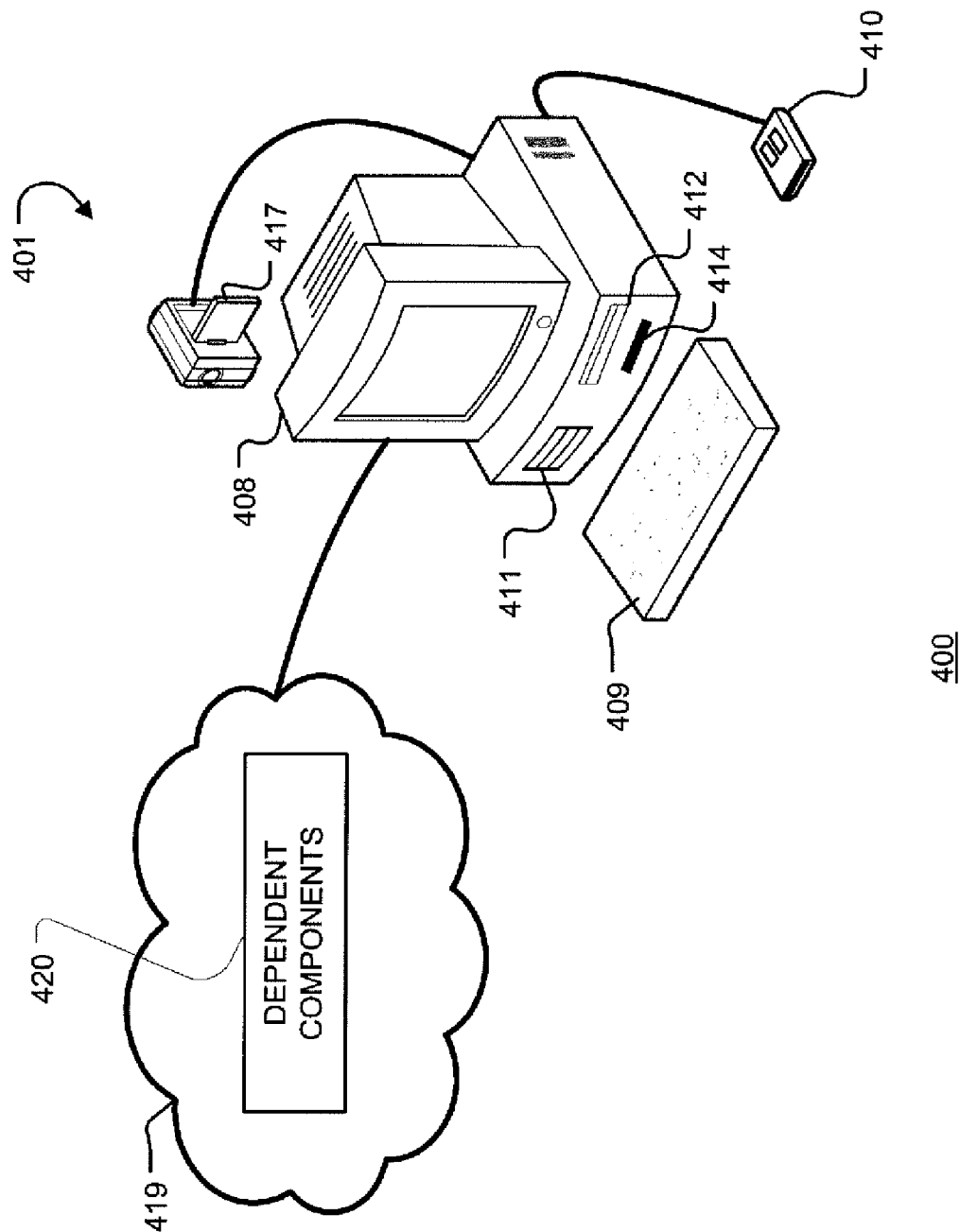
FIG. 4 depicts the exterior appearance of an exemplary system.

FIG. 4 illustrates an example of the exterior appearance of a computing device 401 that further includes a processor. During a runtime of an application, the processor (or any other data processing apparatus) dynamically accesses, for a plug-in invoked by the application, a manifest listing classes capable of providing an interface for the plug-in, and dependent components that provide functionality to the plug-in, and instantiates a class instance of at least one of the listed classes. The processor further dynamically resolves the listed dependent components, and loads the plug-in.

In more detail, the hardware environment of the computing device 401 includes a display monitor 408 for displaying text and images to interface with a user, a keyboard 409 for entering text data and user commands into the computing device 401, a mouse 410 for pointing, selecting and manipulating objects displayed on the display monitor 408, a fixed disk drive 411, a removable disk drive 412, a tape drive 414, a hardcopy output device, a computer network connection to a network 419 that stores dependent components 420, and a digital input device 417.

The display monitor 408 displays the graphics, images, and text that make up the user interface for the software applications used by the computing device 401, as well as the operating system programs necessary to operate the computing device 401. A user uses the keyboard 409 to enter commands and data to operate and control the computer operating system programs as well as the application programs. The mouse 410 may be any type of pointing device, and may be a joystick, a trackball, a touch-pad, or other pointing device. Software used to display a user interface and enable a user to enter or select text, numbers, or select from a menu of options is stored locally on computer readable memory media, such as the fixed disk drive 411.

In a further implementation, the fixed disk drive 411 itself may include a number of physical drive units, such as a redundant array of independent disks ("RAID"), or may be a disk drive farm or a disk array that is physically located in a separate computing unit. Such computer readable memory media allow the computing device 401 to access computer-executable process steps, application programs and the like, stored on removable and non-removable memory media.

The computer network connection may be a modem connection, a local-area network ("LAN") connection including the Ethernet, or a broadband wide-area network ("WAN") connection such as a digital subscriber line ("DSL"), cable high-speed internet connection, a broadband over power line connection, dial-up connection, T-1 line, T-3 line, fiber optic connection, or satellite connection. The network 419 may be a LAN network, a corporate or government WAN network, the Internet, or other network.

The computer network connection may be a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE®-1394 FIREWIRE® connector, a Universal Serial Bus ("USB") connector, a serial port connector, a parallel port connector, or other wireline connector.

The wireless or wireline computer network 419 may be a dial-up network, a local-area network ("LAN") including the Ethernet, a power-line communications network or a broadband wide-area network ("WAN") such as a digital subscriber line ("DSL"), cable high-speed internet network, T-1 line, T-3 line, fiber optic network, or satellite network. The network may be one or more of a LAN network, a corporate or government WAN network, the Internet, or other network.

The computer network connection uses a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS®("IEEE®") Standard 802.11 wireless connector, a BLUETOOTH® wireless connector, a near field communications ("NFC") connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The removable disk drive 412 is a removable storage device that is used to off-load data from the computing device 401 or upload data onto the computing device 401. The removable disk drive 412 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 411 or on removable media for the removable disk drive 412.

The tape drive 414 is a tape storage device that is used to off-load data from the computing device 401 or to upload data onto the computing device 401. The tape drive 414 may be a quarter-inch cartridge ("QIC"), 4 mm digital audio tape ("DAT"), 8 mm digital linear tape ("DLT") drive, or other type of tape.

Furthermore, although the computing device 401 is described above as a desktop PC, in further implementations the computing device 401 may be a laptop, a workstation, a midrange computer, a mainframe, an embedded system, telephone, a handheld or tablet computer, a PDA, a gaming device or console, a digital picture frame, a teleconferencing device, or other type of computer.

Figure 5:
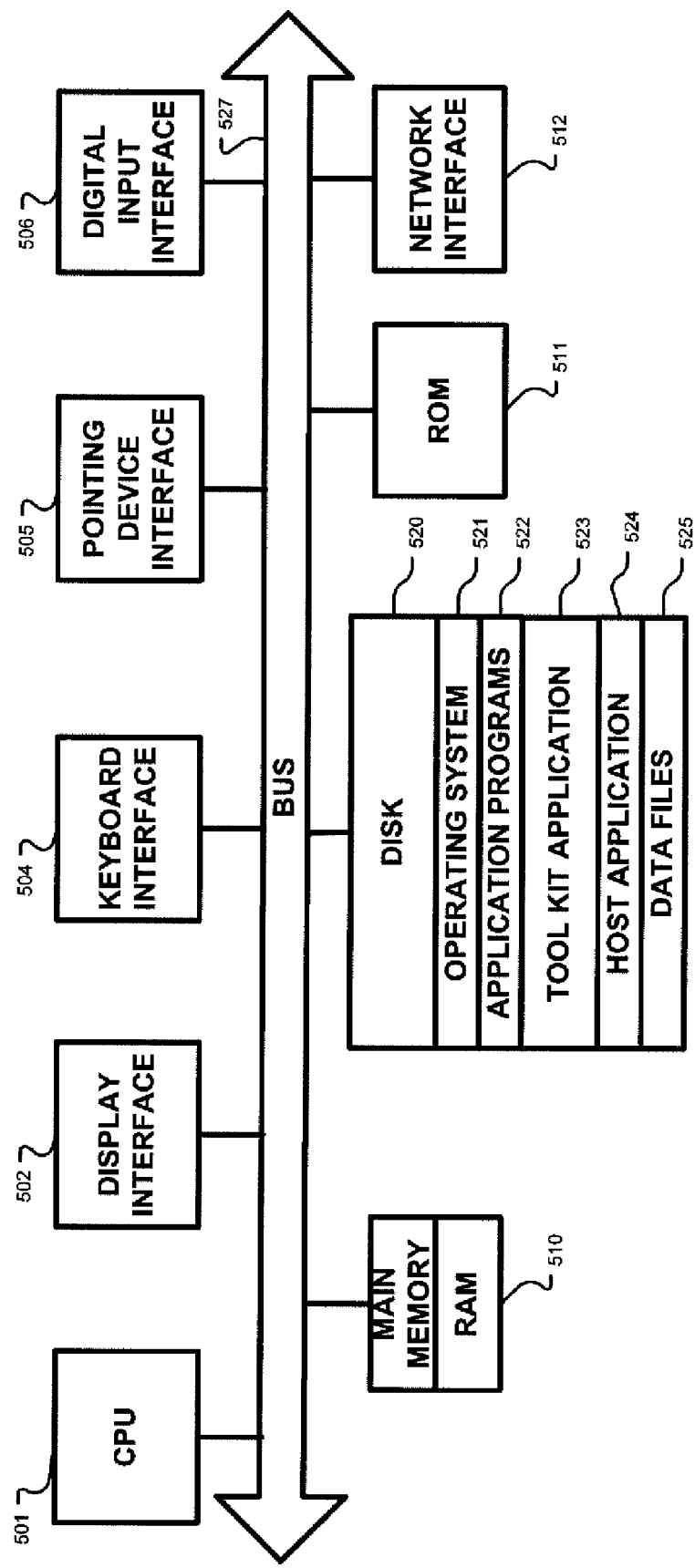
FIG. 5 is a block diagram illustrating the internal architecture of the device shown in FIG. 4.

FIG. 5 is a block diagram illustrating the internal architecture of a computer shown in FIG. 4. An exemplary internal architecture of the computing device 401 is now described. The computing environment includes a computer central processing unit ("CPU") 501, where the computer instructions that comprise an operating system or an application are processed; a display interface 502 which provides a communication interface and processing functions for rendering graphics, images, and texts on the display monitor 408; a keyboard interface 504 which provides a communication interface to the keyboard 409; a pointing device interface 505 which provides a communication interface to the mouse 410 or an equivalent pointing device; a digital input interface 506 which provides a communication interface to the digital input device 417; a hardcopy output device interface which provides a communication interface to the hardcopy output device; a random access memory ("RAM") 510 where computer instructions and data are stored in a volatile memory device for processing by the computer CPU 501; a read-only memory ("ROM") 511 where invariant low-level systems code or data for basic system functions such as basic input and output ("I/O"), startup, or reception of keystrokes from the keyboard 409 are stored in a non-volatile memory device; and a storage 520 or other suitable type of memory (e.g., such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 521, application programs 522 (including the tool kit application 523, and host applications 524 as necessary) and data files 525 are stored; a computer network interface 512 which provides a communication interface to the network 419 over the computer network connection. The constituent devices and the computer CPU 501 communicate with each other over the computer bus 527.

According to one general implementation, a computer program product is tangibly embodied or recorded in a machine-readable medium such as storage 520. The computer program product includes instructions that, when read by a machine, operate to cause data processing apparatus to, during a runtime of an application, dynamically access, for a plug-in invoked by the application, a manifest listing classes capable of providing an interface for the plug-in, and dependent components that provide functionality to the plug-in, and to dynamically instantiate a class instance of at least one of the listed classes. The computer program product also includes instructions that operate to cause the data processing apparatus to, during a runtime of an application, dynamically resolve the listed dependent components, and to dynamically load the plug-in.

The RAM 510 interfaces with the computer bus 527 so as to provide quick RAM storage to the computer CPU 501 during the execution of software programs such as the operating system application programs, and device drivers. More specifically, the computer CPU 501 loads computer-executable process steps from the fixed disk drive 411 or other memory media into a field of the RAM 510 in order to execute software programs. Data is stored in the RAM 510, where the data is accessed by the computer CPU 501 during execution.

The computing device 401 stores computer-executable code for an operating system 521, the application programs 522 and/or the host application 524 may be word processing, spreadsheet, presentation, gaming, or other applications. Although it is possible to implement the dynamic resolution of dependent components using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 501 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 501 is more than one processing unit, including a multiple CPU configuration found in high-performance workstations and servers, or a multiple scalable processing unit found in mainframes.

The operating system 521 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 521 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT® .NET Compact.

While FIGS. 4 and 5 illustrate one possible implementation of a computing device that executes program code, or program or process steps, configured to dynamically resolve dependent components, other types of computers or implementations may also be used as well.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
    during a runtime of an application, dynamically, for each plug-in of a plurality of invocable plug-ins, individually invoking the plug-ins by:
        accessing a manifest listing classes capable of providing an interface for the plug-in, and dependent components that provide functionality to the plug-in;
        instantiating a class instance of at least one of the listed classes;
        resolving the listed dependent components such that only the dependent components associated with a current invocation of the plug-in are resolved; and
        loading the plug-in.

2. The method of claim 1, further comprising dynamically unloading the plug-in during the runtime of the application.

3. The method of claim 2, wherein unloading the plug-in further comprises:
    un-resolving the listed dependent components; and
    de-instantiating the class instance.

4. The method of claim 2, further comprising dynamically re-loading the plug-in during the runtime of the application.

5. The method of claim 1, wherein the interface comprises an Application Programmable Interface (API).

6. The method of claim 1, wherein instantiating the class instance further comprises instantiating first and second class instances of the at least one of the listed classes,
    wherein the first and second class instances are isolated at a component instance level.

7. The method of claim 6, wherein the first and second class instances are instantiated using first and second class instance factories, respectively.

8. The method of claim 6, wherein the isolated first and second class instances are non-identical despite the at least one of the listed classes being the same.

9. The method of claim 1, further comprising communicating, via the interface provided by the instantiated class instance, a request from the application to the plug-in to perform functionality provided by the dependent components, the request identifying the plug-in using a unique identifier or resource locator.

10. The method of claim 1, further comprising:
    during the runtime of the application, dynamically selecting the at least one of the listed classes based on a version of the interface, the application, or the dependent components,
    wherein the selected at least one of the listed classes is instantiated as the class instance.

11. The method of claim 1, wherein the manifest further comprises:
    an identifier or name of the plug-in;
    a version of the plug-in;
    a provider of the plug-in;
    information regarding a license of the plug-in;
    a digital signature of the plug-in; and
    redirection information pointing to a location of the plug-in.

12. The method of claim 1, wherein the classes capable of providing the interface between the application and the plug-in are listed as class descriptors, wherein each class descriptor further comprises:
    an identifier or name of the class;
    a plain text description of a functionality of the class;
    information regarding a license of the class;
    a digital signature of the class; and
    redirection information point to a location of the class.

13. The method of claim 1, wherein resolving the listed dependent components further comprises pre-loading the listed dependent components.

14. The method of claim 1, wherein resolving the listed dependent components further comprises caching the listed dependent components.

15. The method of claim 1, wherein the plug-in is loaded based on instantiating the class instance and further based on resolving the listed dependent components.

16. The method of claim 1, wherein, at a compile-time of the plug-in, code of the plug-in does not specifically identify the dependent components.

17. A device comprising a processor configured to:
    during a runtime of an application, dynamically, for each plug-in of a plurality of invocable plug-ins, individually invoking the plug-ins by:
        access a manifest listing classes capable of providing an interface for the plug-in, and dependent components that provide functionality to the plug-in;
        instantiate a class instance of at least one of the listed classes;
        resolve the listed dependent components such that only the dependent components associated with a current invocation of the plug-in are resolved; and
        load the plug-in.

18. A computer program product, tangibly embodied in a machine-readable medium, the computer program product comprising instructions that, when read by a machine, operate to cause data processing apparatus to:

during a runtime of an application, dynamically, for each plug-in of a plurality of invocable plug-ins, individually invoking the plug-ins by:
  access a manifest listing classes capable of providing an interface for the plug-in, and dependent components that provide functionality to the plug-in;
  instantiate a class instance of at least one of the listed classes;
  resolve the listed dependent components such that only the dependent components associated with a current invocation of the plug-in are resolved; and
  load the plug-in.

* * * * *